C. T. MASON.
Electro-Magnetic Engines.

No. 213,220. Patented Mar. 11, 1879.

WITNESSES:
A. Schehl
J. H. Scarborough

INVENTOR:
C. T. Mason.
BY Munn & Co
ATTORNEYS.

UNITED STATES PATENT OFFICE.

CHARLES T. MASON, OF SUMTER COURT-HOUSE, SOUTH CAROLINA.

IMPROVEMENT IN ELECTRO-MAGNETIC ENGINES.

Specification forming part of Letters Patent No. 213,220, dated March 11, 1879; application filed October 5, 1878.

*To all whom it may concern:*

Figure 1:
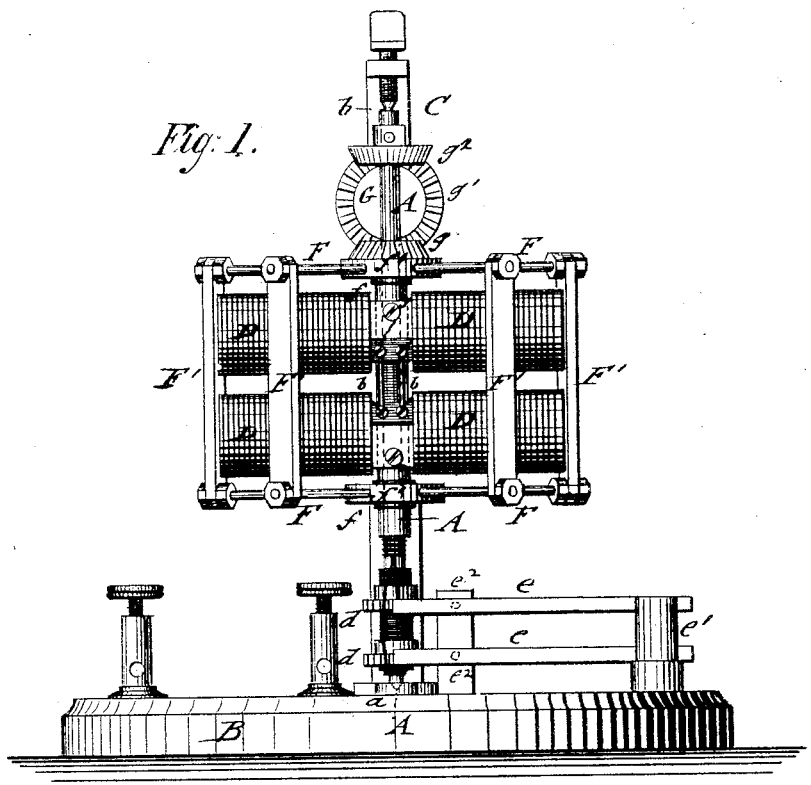
Figure 2:
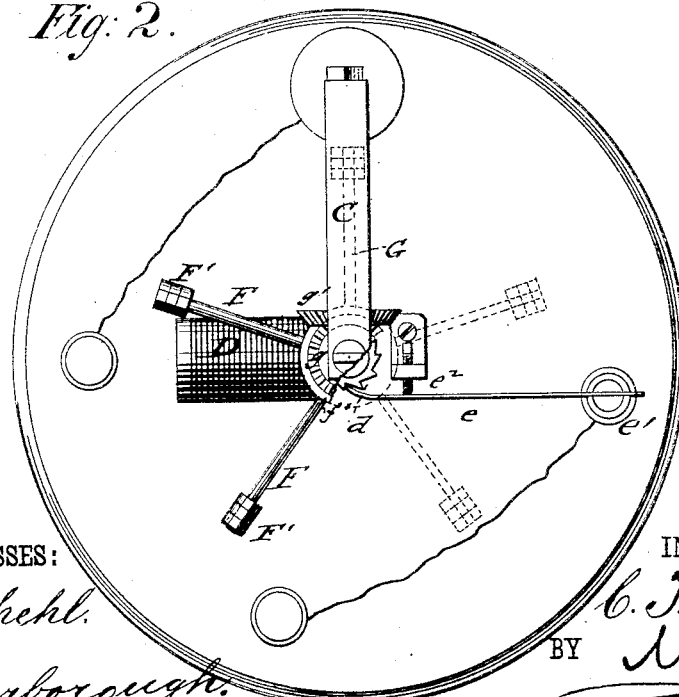

Be it known that I, CHARLES T. MASON, of Sumter Court-House, in the county of Sumter and State of South Carolina, have invented a new and Improved Electro-Magnetic Engine, of which the following is a specification:

In the accompanying drawings, Figure 1 represents a side elevation of my improved electro-magnetic engine, and Fig. 2 a plan view of the same with part broken off.

Similar letters of reference indicate corresponding parts.

This invention relates to an improved electro-magnetic engine of simple and effective construction, in which both the magnets and armatures are revolving, but in opposite direction to each other, so as to utilize thereby more fully the electric force of the current; and the invention consists of a vertical shaft with two or more sets of magnets, which extend diametrically to each other therefrom, and which are alternately thrown into circuit by means of insulated spur-wheels and contact-springs.

The vertical armatures are supported by radial top and bottom arms, which turn by center collars on shoulders of the shaft of the magnets. The armatures are successively attracted by the electro-magnets and revolved thereby, the magnets being simultaneously revolved by a bevel-gear connection of one of the armature-collars with the shaft of the magnets.

Referring to the drawings, A represents a vertical shaft, which is supported on a conical bottom step, $a$, of a base-support, B, and by a conical top step, $b$, of a fixed standard, C. From the vertical shaft A extend, at each side and at right angles thereto, two diametrical cores, D, of which two at one side of the shaft are wound by a separate wire from those at the other side, so as to form an electro-magnet at each side of the shaft. An insulating-plate of the shaft, between the magnets, facilitates the proper disposition of the wires.

At the lower part of the shaft is arranged a circuit-changer, E, which consists of two spur-wheels, $d$, that are insulated by a rubber sleeve from the shaft and from each other. One of the spur-wheels $d$ is connected by a wire with one set of magnets, and the other, by a second wire, with the opposite set of magnets of the shaft A. The connecting-wires pass up in grooves of the shaft to the coils of the magnets, and are properly insulated therefrom.

The teeth of the spur-wheels are so disposed that the teeth of one are placed intermediately between those of the other wheel, so as to alternate therewith. They are thereby brought alternately in contact with contact-springs $e$ of a pillar, $e^1$, the springs being adjusted to the proper contact with the teeth of the spur-wheels by screw-studs $e^2$. The supporting-pillar $e^1$ of the springs is connected to one pole of the battery, while the standard C and the shaft A are connected to the other pole. The opposite ends of the coils are brought into metallic connection with the upper part of the shaft.

On shoulders $f$ of the vertical shaft A, above and below the magnets, are loosely-supported disk-shaped collars $f'$, from which radiate an uneven number of arms, F. To the outer ends of the arms F are attached, close to the face ends of the cores of the magnets, vertical armatures F'. The upper collar, $f$, carries a fixed bevel-wheel, $g$, which meshes with a bevel-wheel, $g^1$, of a horizontal shaft, G, the bevel-wheel $g^1$ also gearing with a conical wheel, $g^2$, of the vertical shaft A.

As the current is thrown by the circuit-changer alternately first into one, then into the other, set of magnets, the first magnets attract the nearest armature, and cause thereby the turning of all the armatures, and, by the connecting bevel-gear, the simultaneous revolving of the vertical shaft and magnets. As soon as the armature first attracted has passed the face of the first magnets, the current is thrown into the opposite magnets, which is then placed intermediately between two opposite armatures, so that it attracts one of them, and continues thereby the rotating motion of the armatures and of the magnets in opposite directions to each other. The next change of the current to the magnets first excited attracts the next adjoining armature, the opposite magnets, then the next armature on the other side, and so on, the alternate action of the magnets keeping up the continuous motion of the armatures and magnets, and transmitting thereby a steady rotary motion to the horizontal shaft G, from which the power may be transferred in any suitable manner for driving light machinery, or for any other purpose.

In place of two magnets, four or more may be used, the number of armatures and the arrangement of the circuit-changer being made to correspond thereto.

The simultaneous motion of the coils and armatures admits the more complete utilization of the electric force of the current, as, owing to the quick passage of the armature beyond the coil, there is no back-pressure from the attraction of the armature just passed, as is the case in other electro-motors.

The joint motion of magnets and armatures furnishes the rapid succession of attraction and release of the armatures, and thereby a uniform and steady motion, by a very simple construction of the motor.

Having thus described my invention, I claim as new and desire to secure by Letters Patent—

1. In an electro-magnetic engine, the combination of a vertical shaft having horizontal magnets, thrown alternately into circuit, with a number of vertical armatures supported on the main shaft, and connected by a bevel-gear thereto, so as to cause the simultaneous revolving of magnets and shafts in opposite directions to each other, substantially as and for the purpose set forth.

2. The combination of horizontal magnets and a set of vertical armatures, supported by top and bottom arms on the shaft of the magnets, with a circuit-changing mechanism, and with a transmitting bevel-gear, so as to cause, by the attraction and revolving of the armatures, the simultaneous revolving of the magnets in opposite direction thereto, substantially as set forth.

3. In an electro-motor, the combination of a vertical shaft, carrying horizontal electro-magnet, and having top and bottom shoulders, with loosely-fitting collars of the supporting top and bottom arms of the vertical armatures, so that the armature-frames revolve freely on shafts, substantially as set forth.

CHARLES T. MASON.

Witnesses:
ALEX. MORRIS,
CHARLES W. DAVIS.